US005622783A

United States Patent [19]
Huizer et al.

[11] Patent Number: 5,622,783
[45] Date of Patent: Apr. 22, 1997

[54] PRESSURE-SENSITIVE ADHESIVE AND A PRESSURE-SENSITIVE COMPRISING CONSTRUCTION CONTAINING A LAYER OF THE ADHESIVE

[75] Inventors: L. Huizer, Zoetermeer; H. van der Bent, Katwijk; P. J. Heederik, Delft, all of Netherlands

[73] Assignee: Avery Dennison Corporation, Pasadena, Calif.

[21] Appl. No.: 215,002

[22] Filed: Mar. 18, 1994

Related U.S. Application Data

[63] Continuation of Ser. No. 795,970, Nov. 22, 1991, abandoned.

[30] Foreign Application Priority Data

Nov. 23, 1990 [NL] Netherlands ............... 90.02557

[51] Int. Cl.$^6$ ........................................ C09J 7/02
[52] U.S. Cl. .................... 428/355 EN; 428/520; 525/222; 525/231; 525/238; 525/239; 525/306; 525/317
[58] Field of Search ................. 428/355, 520; 525/222, 231, 238, 239, 306, 317

[56] References Cited

U.S. PATENT DOCUMENTS

| | | | |
|---|---|---|---|
| 3,708,388 | 1/1973 | Lindemann et al. | 161/247 |
| 4,296,017 | 10/1981 | Weissgerber | 428/355 |
| 4,337,284 | 6/1982 | Cooper | 428/355 |
| 4,659,625 | 4/1987 | Decroly | 428/412 |
| 4,959,269 | 9/1990 | Dehennau | 428/520 |
| 4,985,488 | 1/1991 | Landin | 428/355 |

*Primary Examiner*—Jenna Davis
*Attorney, Agent, or Firm*—Christie, Parker & Hale, LLP

[57] ABSTRACT

A pressure-sensitive adhesive composition comprising an ethylene-vinyl chloride polymer containing at least 40% by weight of the polymer of vinyl-acetate to serve as a permanent pressure-sensitive adhesive for bonding front materials to plasticizer vinyl and other substrates.

21 Claims, No Drawings

PRESSURE-SENSITIVE ADHESIVE AND A PRESSURE-SENSITIVE COMPRISING CONSTRUCTION CONTAINING A LAYER OF THE ADHESIVE

CROSS-REFERENCE TO RELATED APPLICATION

This is a continuation of application Ser. No. 07/795,970, filed Nov. 22, 1991, now abandoned.

FIELD OF THE INVENTION

The invention relates to a pressure-sensitive adhesive for permanently adhering a front layer (backing) to a substrate, particularly a plasticized vinyl substrate and to a pressure-sensitive construction consisting of front layer having on at least one surface thereof such pressure-sensitive layer, and to a method for preparing such pressure-sensitive adhesive construction.

BACKGROUND OF THE INVENTION

The invention especially relates to a pressure-sensitive adhesive which is suitable for adhering front materials or backing to substrates containing plasticized polyvinyl chloride. Such vinyl substrates are used on a large scale for indoor surfaces such as wall coverings and outdoor surfaces such as vinyl-coated canvas for trucks. These vinyl substrates contain as much as 25–75 parts of monomeric plasticizer per 100 parts of vinyl resin. Letters, figures or drawings can be applied to such vinyl substrates by painting or printing with silk-screen ink. For this purpose a pressure-sensitive film imprinted with letters, figures, etc., or cut into the shape of letters, figures, etc. can also be used too.

The front layer as well as the adhesive layer of such a pressure-sensitive adhesive film must meet certain requirements in order to prevent problems occurring by migration of plasticizer out of the substrate and into the pressure-sensitive adhesive layer. If materials are used which are unsuitable for the front layer and/or the adhesive layer, the front layer may tend to wrinkle or become sticky and the adhesive layer may lose its adhesive strength.

European Patent Application 103.407 incorporated herein by reference discloses a pressure-sensitive film that is suitable for adhesion to a vinyl substrate containing monomeric plasticizer. This film comprises a first layer of polyvinyl chloride, a second layer of a plasticizer resistant pressure-sensitive adhesive, and a third layer between the first and second layers, serving as a barrier for plasticizer from the substrate. As suitable adhesives polyacrylates are disclosed that are a combination of the following monomers:

a) acrylic acid, methacrylic acid, acrylic amide and/or methacrylic amide, b) an alkyl acrylate and/or alkyl methacrylate and c) at least one additional ethylenically unsaturated monomer.

In European Patent Application 330,272 incorporated herein by reference the suggestion is made to replace the polyvinyl chloride outer layer and the barrier layer of the above-mentioned film by one single layer consisting of a mixture of polyvinyl chloride and chlorinated polyethylene. For the adhesive layer reference is made to the above European Patent Application.

The group of adhesives from which a choice can be made as to the adhesion of front materials that are generally based on plasticized polyvinyl chloride to substrates containing monomeric plasticized polyvinyl chloride, is therefore rather limited.

It is one object of this invention to provide an adhesive for the application stated above, offering a stronger adhesion than the adhesives know so far.

A further object of this invention to provide an adhesive that adheres strongly shortly after application to the substrate. Another object is to provide an adhesive that presents good properties when applied outside at usual ambient temperature conditions.

SUMMARY OF THE INVENTION

There is provided in accordance with the invention a pressure-sensitive adhesive comprising an ethylene-vinyl acetate copolymer having a vinyl acetate content of more than 40% by weight for use in bonding front materials or backing to a substrate, particularly plasticized vinyl substrates.

The preferred pressure-sensitive adhesives preferably have a vinyl acetate content of the ethylene-vinyl acetate copolymer of at least 50% by weight, more preferably at 60 to 00% by weight.

The pressure-sensitive adhesives may contain a plasticizer which is present in an amount of up to 50% by weight preferably 10–30% by weight, more preferably 15–25% by weight. The preferred plasticizer is dioctyl phthalate.

There may be included in the pressure-sensitive adhesive composition up to 50% by weight of modifying thermoplastic polymer which is sufficiently polar to be compatible with the plasticizer and sufficiently compatible with the ethylene-vinyl acetate copolymer to enable formulating an adhesive in which the ethylene-vinyl acetate copolymer content is at least 5% by weight.

The thermoplastic polymer is preferably vinyl chloride including copolymers of vinyl chloride polymer. cellulose ester polymers, acetate modified styrene acrylonitrile polymers and mixtures thereof.

Typical of the substrates to which the adhesive is bonded includes plasticized polyvinyl chloride to which the adhesive acts as a permanent adhesive and is plasticizer tolerant. Binding may be made to other substrates as well.

Typical of the front layer or backing are thermoplastic materials such as plasticized thermoplastics such as a mixture of polyvinyl chloride and chlorinated polyethylene.

The pressure-sensitive products are typically constructed by applying the adhesive composition from an organic solvent onto a release liner, evaporating the solvent and a dry laminate front layer or backing onto the adhesive layer. The release liner is removed for use. The adhesive may be if desired applied to both sides of the backing.

DETAILED DESCRIPTION

Novel pressure-sensitive adhesive for bonding front materials or backing to substrates particularly plasticized vinyl substrates has been found which adhesive comprises an ethylene-vinyl acetate copolymer having a vinyl acetate content of more than 40% by weight, preferably at least 50% by weight, and more preferably from 60 to 80% by weight.

The adhesive according to the invention, applied to various front or backing materials, offers an excellent adhesion to plasticizer containing vinyl substrates, both shortly after application to the substrate (20 min) and after having aged for several weeks at 70° C. Shortly after application to the substrate the adhesion is so strong that it can be regarded as permanent adhesive. By the expression "permanent adhesive" as used herein this is meant that the peel force required to peel the film applied to selected substrates amount to more than 8 Newtons per inch after 24 hours according to PSTC-1 incorporated herein by reference without leaving remnants of the adhesive on the substrate. The adhesive according to the invention has been found to offer a more or less permanent adhesion also to a limited group of other substrates, such as polymethyl methacrylate polystyrene, hard polyvinyl chloride, polycarbonate and polyacrylonitrile-butadiene styrene. Adhesion to plasticized polyvinyl chloride is the strongest.

A significant utility of the adhesives of the invention therefore resides in a pressure-sensitive adhesive as for permanently adhering a front layer to a substrate, especially a substrate containing plasticized polyvinyl chloride.

If the vinyl acetate content of the ethylene-vinyl acetate copolymer is 45% by weight, a moderate adhesion is obtained. Adhesion increases with an increase in the vinyl acetate content.

Unlike copolymers having a lower vinyl acetate content. Ethylene-vinyl acetate copolymers having a vinyl acetate content of more than 40% by weight have not been heretofore recommended for application in adhesives. For instance, ethylene-vinyl acetate having a vinyl acetate content of 70% by weight, invention has been recommended as a chlorine-free cable isolation material showing a reduced smoke formation during fire.

It is also noted that in Japanese Patent Application 61283677 incorporated herein by reference ethylene-vinyl acetate is mentioned as a synthetic resin coating for rebondable note-papers capable of being repeatedly adhered to and removed from surfaces. In this application no mention is made of the vinyl acetate content and there is no indication that the vinyl acetate content should be high. It can furthermore not be derived from this patent application that an ethylene-vinyl acetate copolymer having a vinyl acetate content of more that 40% by weight can be used for permanently adhering a front layer to a plasticized vinyl substrate. The Japanese Patent Application only refers to the non-permanent adhering properties of synthetic resins such as ethylene-vinyl acetate.

Another mention of ethylene-vinyl acetate copolymer as a pressure-sensitive adhesive is made in European Patent Application 299,884. However, here the vinyl acetate content is restricted to 25–40% by weight. A film consisting of a thermoplastic front material and such an adhesive is applied for temporarily protecting various surfaces. When the film is removed it leaves no trace of adhesive. Therefore, the adhesion in question is a non permanent adhesive.

European Patent Application 201,890 incorporated herein by reference uses an adhesive which is a solid thermoplastic adhesive at room temperature, e.g. ethylene-vinyl acetate. The adhesive in question is not a pressure-sensitive adhesive. Rather, heating is required in order to obtain adhesive properties. However, according to the present invention melting is not necessary. At ambient temperature, adhesion to the substrate is obtained by simply pressing. In addition, the vinyl acetate content of the copolymer used in the examples of the European patent application is not higher than 25% by weight. This is consistent with the recommendations of ethylene-vinyl acetate producers since heat activated, hot melt adhesives based on ethylene-vinyl acetate are to have a low vinyl acetate content and in any case less than 40% by weight.

European Patent Application 201.890 mentions metals as the most important substrates. From this patent application it can therefore not be derived either that an ethylene-vinyl acetate copolymer having a vinyl acetate content of more than 40% by weight can be used for permanently adhering a front layer to a plasticized vinyl substrate.

The adhesive according to the invention can consist for 100% of ethylene-vinyl acetate copolymer having a vinyl acetate content of more than 40% by weight.

The addition of a plasticizer in a quantity of up to 50% by weight, preferably 10–30% by weight and more preferably 15–25% by weight, has a favorable effect on the properties of the adhesive. The addition of the plasticizer reduces the glass transition temperature. For instance, when dioctyl phthalate, in a quantity of 20% by weight, is added to an ethylene-vinyl acetate copolymer having a vinyl acetate content of 70% by weight glass transition temperature, the (Tg) drops from −12.9° C. to −28.7° C. The addition of plasticizer can therefore be essentially favorable when used outside. Besides dioctyl phthalate, other conventional monomeric plasticizers may also be used.

It has further been found that the addition of a modifying thermoplastic polymer which is a) sufficiently polar to show compatibility with plasticizer and b) sufficiently compatible with the ethylene-vinyl acetate copolymer also has a favorable effect on the adhesive properties. In particular said modifying polymer incorporated in the present adhesive enhances the dimensional stability of a front material, applied on plasticized polyvinyl chloride and similar substrates, even upon ageing at elevated temperature. Said modifying polymer will hereinafter often be referred to as a modifier. The pressure-sensitive adhesive may comprise up to 50% by weight of the modifier, the quantity of the ethylene-vinyl acetate copolymer being at least 5% by weight of the adhesive. Preferred pressure-sensitive adhesives of the invention comprise 50–85% by weight of ethylene-vinyl acetate copolymer, 10–30% by weight of plasticizer and 5–20% by weight of the modifier.

Generally, the modifiers are tough polymers having a relatively high molecular weight. Particularly suitable modifiers are those selected from the group consisting of cellulose esters, vinyl chloride polymers, acrylate modified styrene-acrylonitrile copolymers and mixtures thereof.

Suitable examples of cellulose ester include cellulose acetate butyrate (CAB) and cellulose acetate propionate (CAP), available from e.g. Eastman Kodak company, for examples CAB-500-5 and CAP-482-20.

Suitable examples of vinyl chloride polymers include copolymers of vinyl chloride and vinyl acetate, for example VYNS, commercially available from Union Carbide, containing 90% of vinyl chloride and 10% of vinyl acetate; a terpolymer of vinyl chloride, vinyl acetate and hydroxyethyl methacrylate, for example VROH commercially available from Union carbide; and a graft polymer of ethylene-vinyl acetate onto polyvinyl chloride, for example VK 801, containing 50% vinyl chloride and 50% grafted ethylene-vinyl acetate copolymer, commercially available from Wacker Chemic GmbH.

Suitable examples of acrylate modified stryrene-acrylonitrile copolymers include those commercially available from BASF, Germany, under the trade name Luran, especially Luran S 776 S.

According to another aspect of the invention a pressure-sensitive construction is provided consisting of at least one front layer or backing providing at least on surface having thereon an adhesive layer comprising the adhesive as described above.

The front layer or backing may consist of the usual materials that are suitable for application to plasticized vinyl substrates. As mentioned above, the materials in question are generally thermoplastic materials that usually contain plasticizer. These front materials are often pigmented. Examples are mixtures of polyvinyl chloride and chlorinated polyethylene optionally containing a monomeric plasticizer, and polyvinyl chloride containing polymeric plasticizers. The thickness of the front layer is not critical, but it generally amounts to 0.01–0.15 mm.

The weight of the adhesive layer applied to the front layer is not critical either, but it generally amounts to no more than 100 g/m². A suitable amount is 30–90 g/m². Larger amounts of adhesive result in stronger adhesion.

A release liner is usually provided for protection of the adhesive on the side of the adhesive layer opposed to the side in contact with the front layer.

The pressure-sensitive construction according to the invention may be prepared by various methods. Preferably the adhesive according to the invention, dissolved in an organic solvent, is coated onto a release liner, the solvent is evaporated and a front layer is dry laminated onto the adhesive layer, after which the release liner is removed for use. Other methods for preparing the pressure-sensitive construction are e.g. co-extrusion and heat sealing of the two layers.

The ethylene-vinyl acetate copolymer component of the adhesive according to the invention can be applied in all usual forms, for example as emulsion resin, solvent resin, etc. Emulsion resins, however, are less suitable for outdoor application because of poor weathering resistance.

The examples below further illustrate the invention but should not be regarded as a restriction thereof.

In all examples the pressure-sensitive constructions were made as follows: the adhesive components were dissolved in an organic solvent; the solution obtained was coated onto a release liner; the release liner was dried in a ventilated oven; the front material was heated up to 80° C. and dry laminated onto the adhesive layer; the release liner was removed from the laminate and the film obtained was applied to a substrate by means of the adhesive layer.

In all cases, the adhesive weight amounted to 40 g/m², unless stated otherwise.

Front materials were used. In some of the examples a polyvinyl chloride/chlorinated polyethylene-blend (pvc/cpe) containing a monomeric plasticizer was used and in the other examples a commercially available pigmented marking film was used, base on polymeric plasticized polyvinyl chloride. Said front materials were each applied to a specific substrate. In each case, the pvc/cpe was applied to a tarpaulin cover that is usually applied to protect cargo on trucks and consists of plasticized polyvinyl chloride, reinforced with a woven structure. A commercially available blue tarpaulin supplied by Besouw in Etten-Leur, Netherlands was used. In each case the marking film was applied to a reinforced monomeric plasticized polyvinyl chloride which is commercially available from Signtech in London under the name of Signtech 20 AC.

After applying the pressure-sensitive construction to the substrate, 180° C. peel adhesion was usually determined, after 20 min. (no ageing) and/or after ageing (during a certain period of time at 70° C.). For this purpose samples of the pressure-sensitive films having a length of 150 mm and a width of 25 mm were used. The samples were removed at an angle of 180° and at a speed of 300 mm/min. with the aid of a tensile testing machine at a temperature of 23°±2° C. Peel adhesion is indicated in Newtons per inch (N/inch).

EXAMPLE 1

Pressure-sensitive films were prepared according to the method described above. The adhesive components were ethylene-vinyl acetate copolymer having a vinyl acetate content of 50% by weight (No. IV. of Table B) and quantities of dioctyl phthalate (DOP) varying from 0 up to 30% by weight. The pvc/cpe was used as front material (and tarpaulin as substrate). 180° Peel adhesion was determined after 20 min. and after ageing of the whole for three weeks at 70° C. The results are shown in Table A.

TABLE A

| | Effect of ageing on adhesion | |
|---|---|---|
| DOP content | 180° Peel adhesion (N/inch) | |
| (% by weight) | After 20 min. | After 3 weeks at 70° |
| 0 | 16 | 22 |
| 10 | 15 | 23 |
| 20 | 14 | 21 |
| 30 | 13 | 19 |

EXAMPLE 2

Pressure-sensitive films were prepared according to the method described above. The adhesive components were ethylene-vinyl acetate copolymers having vinyl acetate contents varying from 45 up to 75% by weight and dioctyl phthalate in a quantity of 10 and 20% by weight. The ethylene-vinyl acetate copolymers are mentioned in Table B. The pvc/cpe was used as front material. 180° Peel adhesion was determined after 20 min. and after ageing of the film applied on tarpaulin for one week at 70° C. The results are shown in Table C.

TABLE B

| Ethylene-vinyl acetate (EVA) copolymer | I | II | III | IV | V |
|---|---|---|---|---|---|
| Vinyl acetate content (%) | 45 | 45 | 45 | 50 | 70 |
| Melt index* | 2–5 | 5–15 | 15–30 | 2–5 | 2–5 |
| Mooney viscosity** | 22–30 | 15–22 | 8–15 | 20–28 | 16–28 |

*g/10 min; 190° C., 2.16 kg; DIN 53735
**ML 1–4/100° C.; DIN 53735

TABLE C

| | Effect of vinyl acetate content on adhesion | |
|---|---|---|
| Composition of | 180° Peel adhesion (N/inch) | |
| adhesive | After 20 min. | After 1 week at 70° C. |
| I + 10% DOP | 12.5 | 26 |
| IV + 10% DOP | 15 | 23 |
| II + 20% DOP | 11 | 22 |
| III + 20% DOP | 11 | 22 |
| V + 20% DOP | 30 | 25 |

EXAMPLE 3

Pressure-sensitive films were prepared according to the method described above. The adhesive components were ethylene-vinyl acetate copolymer No. IV of Table B, VROH and DOP in various proportions. The pvc/cpe was used as front material. 180° Peel adhesion was determined after 20 min. and after ageing of the film on tarpaulin for three weeks at 70° C. The results are shown in Table D.

TABLE D

Effect of VROH on adhesion

| Composition of adhesive (%) | | | 1800 Feel adhesion (N/inch) | |
| --- | --- | --- | --- | --- |
| VROH | EVA | DOP | After 20 min. | After 3 weeks at 70° C. |
| 10 | 80 | 10 | 14 | 17 |
| 20 | 60 | 20 | 14 | 18 |
| 20 | 80 | 0 | 12 | 15 (1 week) |
| 30 | 60 | 10 | 12 | 17 |
| 40 | 40 | 20 | 11 | 14 |
| 50 | 25 | 25 | 11 | 14 |

EXAMPLE 4

Pressure-sensitive films are prepared according to the method described above. The adhesive components were ethylene-vinyl acetate copolymer V of Table B, DOP and optionally VROH. Again, the pvc/cpe was used as front material. The dimensional stability on tarpaulin was determined after ageing for 48 hours at 70° C. and after ageing for one week at 70° C. at a sample size of 150×150 mm. The results are shown in Table E, in which the total shrinkage is indicated. In machine direction (MD) shrinkage was found. In cross-direction (CD) expansion (negative shrinkage) was found in the absence of VROH.

TABLE E

Effect of VROH on dimensional stability

| Composition of adhesive (%) | | | 48 h, 70° C. | | 1 week, 70° C. | |
| --- | --- | --- | --- | --- | --- | --- |
| VROH | EVA | DOP | mm MD | mmCD | mm MD | mm CD |
| 0 | 100 | 0 | 1.9 | <0 | 2.3 | <0 |
| 0 | 80 | 20 | 1.9 | <0 | 1.7 | <0 |
| 30 | 50 | 20 | 0.7 | 0.0 | 0.9 | 0.0 |

EXAMPLE 5

Pressure-sensitive films were prepared according to the method described above. The adhesive consisted of ethylene-vinyl acetate copolymer No. V of Table B and 20% of DOP. The polyvinyl chloride marking film was used as front material and a number of various materials indicated in Table F were used as substrates. The adhesive weight was 32.5 g/m$^2$. 180° Peel adhesion was determined after 20 min. The results are shown in Table F.

TABLE F

Effect of various substrates on adhesion

| | 180° Peel adhesion (N/inch) | |
| --- | --- | --- |
| Substrates | bond time 20 min. | bond time 24 h. |
| Hard PVC | 17 | 21 |
| Polystyrene | 7 | 14 |
| PMMA | 9 | 13 |
| Polycarbonate | 8 | 13 |
| ABS | 9 | 13 |
| Stainless Steel | 2 | 4 |
| Painted panel | 4 | 5 |
| Nylon | 2 | 3 |

*front material tears

The results show that the adhesive according to the invention only offers permanent adhesion on certain substrates, such as plasticized polyvinyl chloride, polymethyl methacrylate, polystyrene and, to a lesser extent, nylon. However, the adhesion to plasticized polyvinyl chloride is the strongest.

EXAMPLE 6

Pressure-sensitive films were prepared according to the method described above. The adhesive consisted of various types of ethylene-vinyl acetate copolymers of Table B, optionally containing DOP and/or VROH, as indicated in Table G. The polyvinyl chloride marking film was used as front material and Signtech 20 AC was used as substrate. The adhesive weight was 32.5 g/m$^2$. 180° Peel adhesion was determined after ageing during 20 min., during 24 hours and during 24 hours+1 week at 50° C. The results are shown in Table G.

TABLE G

Composition of adhesive

| EVA (No. of Table B) (%) | (DOP) (%) | VROH (%) | 180° Peel adhesion (N/inch) | | |
| --- | --- | --- | --- | --- | --- |
| | | | after 20 min. | after 24 hours | after 24 hours + 1 week at 50° C. |
| V; 100 | 0 | 0 | 21.4 | 16.2* | 21.6 |
| V; 80 | 20 | 0 | 23.7* | 24.4* | 16.2 |
| V; 70 | 30 | 0 | 22 | 21.5 | 14.3 |
| V; 50 | 20 | 30 | 14.3 | 19.7 | 11.4 |
| IV; 80 | 20 | 0 | 12.4 | 12.3 | 15.5 |
| I; 80 | 20 | 0 | 9.4 | 10.1 | 11.4 |

*front material tears

We claim:

1. A pressure-sensitive adhesive suited for use as a permanent pressure-sensitive adhesive for plasticized vinyl substrates which comprises an ethylene-vinyl acetate copolymer in which the vinyl acetate content of the copolymer is more than 40% by weight of the copolymer in admixture with a plasticizer and a modifying thermoplastic polymer which is sufficiently polar to be compatible with the plasticizer and compatible with the ethylene-vinyl acetate copolymer, said modifying polymer being present in an amount 5 to 50% by weight of the adhesive, said ethylene-vinyl acetate copolymer present in an amount of at least 5% by weight of the adhesive and said plasticizer being present in a positive amount up to 50% by weight of the pressure-sensitive adhesive.

2. A pressure-sensitive adhesive as claimed in claim 1 in which the vinyl acetate content of the copolymer is at least 50% by weight of the copolymer.

3. A pressure-sensitive adhesive as claimed in claim 1 in which the vinyl-acetate content of the copolymer is from 60 to 80% by weight of the copolymer.

4. A pressure-sensitive adhesive as claimed in claim 1 in which the plasticizer is present in an amount of from 10 to 30% by weight based on the weight of the pressure-sensitive adhesive.

5. A pressure-sensitive adhesive as claimed in claim 1 in which the plasticizer is present in an amount from 15 to 25% by weight based on the weight of the pressure-sensitive adhesive.

6. A pressure-sensitive adhesive as claimed in claim 1 in which the plasticizer is dioctyl phthalate.

7. A pressure-sensitive adhesive as claimed in claim 4 in which the plasticizer is dioctyl phthalate.

8. A pressure-sensitive adhesive as claimed in claim 5 in which the plasticizer is dioctyl phthalate.

9. A pressure-sensitive adhesive as claimed in claim 1 in which the modifying polymer is selected from the group consisting of cellulose ester polymers, vinyl chloride polymers, acrylate modified styrene-acrylonitrile copolymers and mixtures thereof.

10. A pressure-sensitive adhesive as claimed in claim 1, in which the modifying polymer is selected from the group consisting of cellulose acetate butyrate, cellulose acetate propionate, a copolymer of vinyl chloride and vinyl acetate, a terpolymer of vinyl chloride, vinyl acetate and hydroxyethyl methacrylate and graft copolymer of ethylene-vinyl acetate and polyvinyl chloride.

11. A pressure-sensitive as claimed in claim 1 which comprises 50–85% by weight of ethylene-vinyl acetate copolymer, 10–30% by weight of a plasticizer and 5–20% by weight of the modifying polymer.

12. A permanent pressure-sensitive adhesive construction adapted for use in adhering a backing to a plasticized vinyl substrate which comprises a backing having thereon a permanent pressure-sensitive adhesive comprising an ethylene-vinyl acetate copolymer in which the vinyl acetate content of the copolymer is more than 40% by weight of the copolymer in admixture with a plasticizer and a modifying thermoplastic polymer which is sufficiently polar to be compatible with the plasticizer and compatible with the ethylene-vinyl acetate copolymer, said modifying polymer being present in an amount 5 to 50% by weight of the adhesive, said ethylene-vinyl acetate copolymer present in an amount of at least 5% by weight of the adhesive and said plasticizer being present in a positive amount up to 50% by weight of the pressure-sensitive adhesive.

13. A pressure-sensitive adhesive construction as claimed in claim 12 in which the backing is selected from the group consisting of plasticized polyvinyl chloride and plasticized mixtures of polyvinyl chloride and chlorinated polyethylene.

14. A pressure-sensitive adhesive construction as claimed in claim 12 in which the vinyl acetate content of the copolymer is at least 50% by weight of the copolymer.

15. A pressure-sensitive adhesive construction as claimed in claim 12 in which the vinyl-acetate content of the copolymer is from 60 to 80% by weight of the copolymer.

16. A pressure-sensitive adhesive construction as claimed in claim 13 in which the plasticizer is present in an amount of from 10 to 30% by weight based on the weight of the pressure-sensitive adhesive.

17. A pressure-sensitive adhesive construction as claimed in claim 12 in which the modifying polymer is selected from the group consisting of cellulose ester polymers, vinyl chloride polymers, acrylate modified styrene-acrylonitrile copolymers and mixtures thereof.

18. A pressure-sensitive adhesive as claimed in claim 12, in which the modifying polymer is selected from the group consisting of cellulose acetate butyrate, cellulose acetate propionate, a copolymer of vinyl chloride and vinyl acetate, a terpolymer of vinyl chloride, vinyl acetate and hydroxyethyl methacrylate and graft copolymer of ethylene-vinyl acetate and polyvinyl chloride.

19. A pressure-sensitive adhesive as claimed in claim 12 in which the plasticizer is present in an amount from 15 to 25% by weight based on the weight of the pressure-sensitive adhesive.

20. A pressure-sensitive as claimed in claim 12 which comprises 50–85% by weight of ethylene-vinyl acetate copolymer, 10–30% by weight of a plasticizer and 5–20% by weight of the modifying polymer.

21. A pressure-sensitive as claimed in claim 13 which comprises 50–85% by weight of ethylene-vinyl acetate copolymer, 10–30% by weight of a plasticizer and 5–20% by weight of the modifying polymer.

* * * * *